June 18, 1957  E. W. SCHUMACHER  2,796,313
MEANS AND METHOD OF HEAT-JOINING GLASS ARTICLES
Filed May 1, 1956  2 Sheets-Sheet 1

INVENTOR
ELMER WELDON SCHUMACHER
BY
Louis L. Gagnon
ATTORNEY

June 18, 1957 E. W. SCHUMACHER 2,796,313
MEANS AND METHOD OF HEAT-JOINING GLASS ARTICLES
Filed May 1, 1956 2 Sheets-Sheet 2

INVENTOR
ELMER WELDON SCHUMACHER
BY
*Louis L. Gagnon*
ATTORNEY

United States Patent Office 2,796,313
Patented June 18, 1957

2,796,313

MEANS AND METHOD OF HEAT-JOINING GLASS ARTICLES

Elmer Weldon Schumacher, Sturbridge, Mass., assignor to American Optical Company, Southbridge, Mass., a voluntary association of Massachusetts Application May 1, 1956, Serial No. 581,948

10 Claims. (Cl. 316—19)

This invention relates to improvements in devices for heat-joining parts of glass articles and has particular reference to the provision of novel automatically functioning means and method for bringing about said joining.

This application is a continuation in part of my co-pending application, Serial No. 256,909, filed November 17, 1951, now abandoned.

One of the principal objects of the invention is to provide novel automatically functioning means and method of supporting glass parts to be joined initially in aligned spaced relation with each other, pre-heating said parts to avoid heat shock, moving said parts into proper fitted relation with each other and thereafter heat-sealing said parts together.

Another object is to provide novel automatically functioning means and method of evacuating and degassing and heat-sealing together the parts of the envelope of electron discharge devices to create and maintain a vacuum in said devices and includes particularly the evacuating and sealing of devices of this character of small dimension and of the type having exposed continuous uninterrupted surfaces with substantially no distortion of said surfaces.

Another object is to provide a novel apparatus and method of supporting the base, of a device of the above character, having a plurality of conductors carried thereby and in sealed relation therewith and the envelope of the device in proper aligned relation with each other and thereafter subjecting said aligned parts to the successive steps of evacuating the envelope including the degassing thereof by heating said envelope to a controlled temperature while creating a relatively high vacuum therein, moving said heated envelope into engagement with the base and thereafter causing said envelope and base to join in sealed relation with each other at said location of engagement and in such manner as to retain a relatively high vacuum in said device without distorting the envelope and without injuring the seal of the conductors with said base.

Another object is to provide an improved device and method of the above character wherein the various steps are successively and automatically performed with controlled time cycles as to said respective steps including the step of automatically shutting off said device at the completion of the heat-joining of the parts to permit repetitive use of said device.

Other objects and advantages of the invention will become apparent from the following description taken in connection with the accompanying drawings and it will be apparent that many changes may be made in the details of construction, arrangement of parts, and steps of the method shown and described without departing from the spirit of the invention as expressed in the accompanying claims. I, therefore, do not wish to be limited to the exact details of construction, arrangement of parts and steps of the method shown and described as the preferred form only is given by way of illustration.

Figure 1:
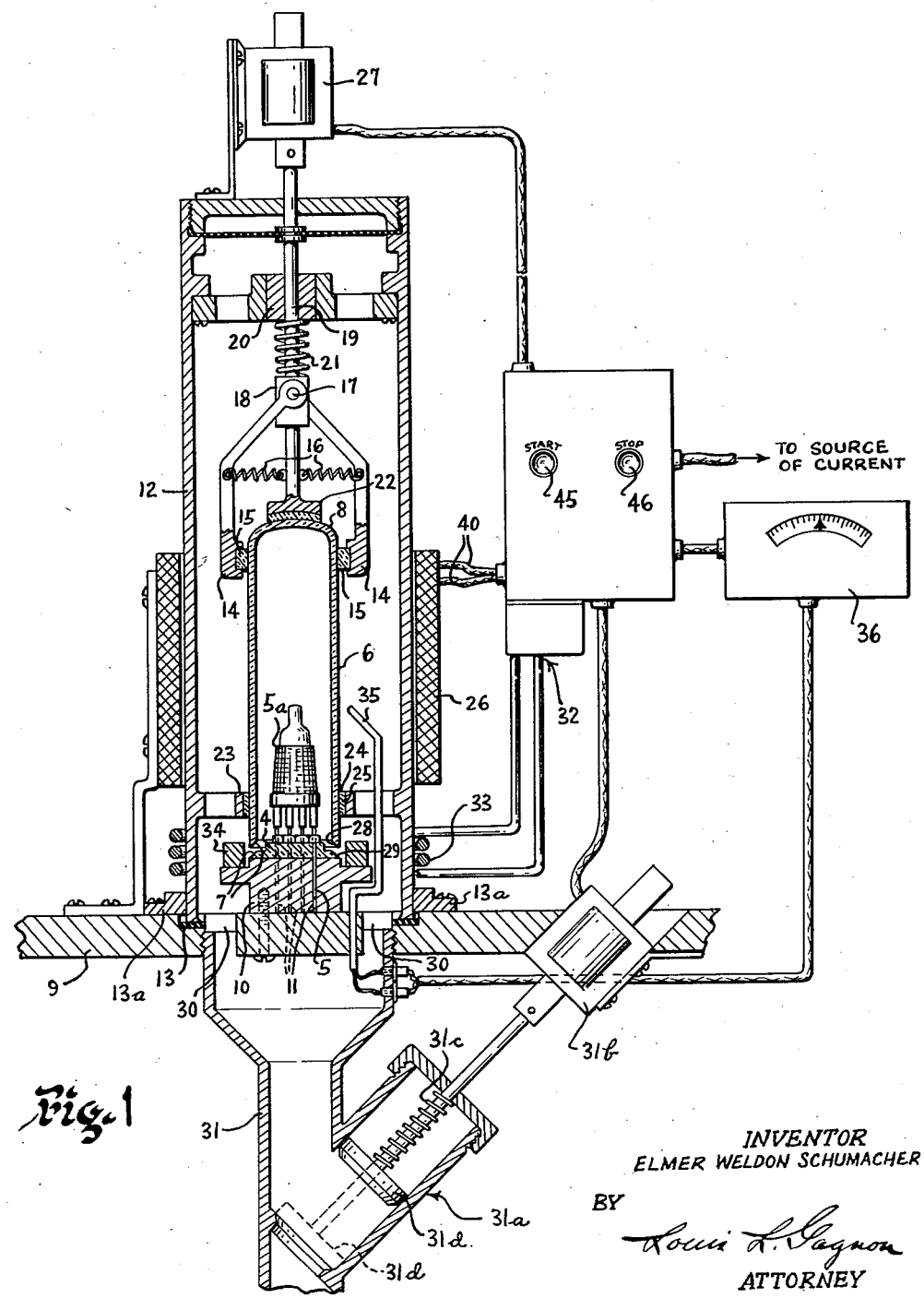
Fig. 1 is a side elevational view, partially in section, of the apparatus and the component parts for carrying out the method of the invention.
Figure 2:
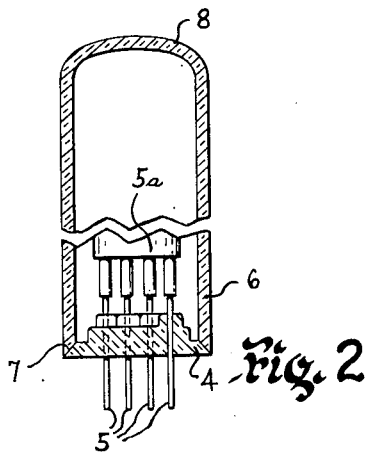
Fig. 2 is an enlarged sectional view of the completed device.
Figure 3:
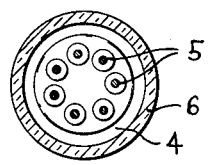
Fig. 3 is a sectional view taken as on line 3—3 of Fig. 2.

Referring to the drawings wherein like characters of reference designate like parts throughout the several views, although the device may be adapted to different uses, the preferred use thereof, as shown throughout the various figures of the drawings, is for producing electron discharge devices. Such electron discharge devices comprise a base 4 formed of glass of a controlled coefficient of expansion having a plurality of conductors 5 supported thereby and in sealed relation therewith and an envelope 6 of glass having substantially the same coefficient of expansion as the glass of the base. The said base 4 and the adjacent end of the envelope 6 are provided with engaging surfaces 7 which, in the completed tube, are in fused sealed relation with each other. The conductors 5 are connected with a desired unit 5a which is to be sealed internally of the device. This unit may be an electron assembly, an electron gun or any other desirable known unit.

It is particularly pointed out that the envelope 6 has its end opposed to the base 4 formed with a continuous uninterrupted surface 8 and it is the intent and purpose of the present invention to provide an apparatus and method of bringing about a sealed relation of the envelope 6 with the base 4 by fusion at the prepared surfaces 7 without distorting the envelope or the surface 8 thereof during said fusing. A further consideration is that of avoiding the introduction of strains in the glass in the completed device and of avoiding damaging the glass-to-metal seal of the base 4 with the conductors 5.

Another important feature is that of creating a high vacuum and of degassing the tube during the assembling and fusing of the envelope 6 with the base 4 and to enable this to be brought about with devices of small dimensions. A further important factor is that of maintaining the various components in proper aligned and spaced relation with each other in the completed device.

With the above in mind, the apparatus for obtaining the desired results and for carrying out the method comprises a main base support 9 having secured thereto a holder 10 preferably formed of a refractory material having therein a plurality of longitudinal openings 11 in proper spaced relation for receiving the conductors 5 of the base 4 and for supporting said base in a proper fixed position.

Surrounding said base 4 is a bell jar 12 having its lower circumferential edge seated on an annular member 13 and within an annular aligning member 13a carried by the base 9. The annular member 13 may be formed of rubber or other suitable material for bringing about a tight seal between the base 9 and the bell jar. Internally of the bell jar 12, there is supported a plurality of gripping fingers 14 having contact members 15 formed of suitable cushioning and heat resisting material for gripping and holding the upper end of the envelope 6. The gripping fingers 14 are resiliently urged in gripping relation with the envelope 6 by coil springs or other suitable means 16. The fingers 14 are pivotally connected at 17 to a block 18 carried by a plunger 19 slidably supported internally of a bearing 20 in the upper end of the bell jar 12. Intermediate the block 18 and the bearing 20, the plunger 19 is provided with a coil spring 21 which is adapted to normally urge the plunger and fingers 14 in a downward direction. The plunger is provided with a contact member 22 for engaging the upper surface 8 of the envelope 6. The plunger 19 carrying the gripping fingers 14 is coaxially related with the holder 10 for the base 4 so that when the envelope 6 is in assembled relation therewith, it will automatically be properly aligned with the base 4. To insure this alignment, however, the bell jar may be provided with an internal support 23 having an opening 24 therein through which the envelope 6 is extended with the position of said opening being such as to automatically align the lower end of the envelope with the base 4 while permitting longitudinal movement of the envelope through said opening 24. The said support is provided with contact means 25 of suitable heat-resistant material and through which the opening 24 is formed. Surrounding the envelope 6 and supported externally of the bell jar 12 is a conventional resistance type heating element 26 which is connected to a suitable source of electrical energy by the lead wires 40. The heat developed by said electrical heating element is adapted to radiate through bell jar 12 and initially heat the envelope 6 to a conditioning temperature sufficient to avoid breakage due to heat shock when the subsequent heat-sealing or fusion takes place at the surfaces 7. The conditioning temperature in this particular instance, for a glass having a softening point, as determined by the Littleton method, of approximately 1170° F., will be from 865° to 752° F. and will be held at a temperature within this range for a period sufficient to bring about the proper results. In this particular instance a period of heating of approximately 2 minutes has proven quite satisfactory.

With a view to more clearly defining the characteristics of this particular glass, we might say that it is a low-temperature type glass having a softening point lying between that of commercially known "crown" glass which is approximately 1335° F. and that of commercially known "flint" glass which is approximately 1088° F.

While the spring 21 is normally adapted to urge the envelope 6 into engagement with the base 4, it is initially desirable to support the said envelope in spaced relation with the base and this is brought about through the provision of a solenoid or like means 27 whose characteristic is such that when energized, it will draw the plunger 19 in an upward direction the amount desired for positioning the envelope 6 in proper spaced relation with the base 4 against the resilient action of the spring 21 and, when de-energized, permit the spring to automatically cause the envelope 6 to move into engagement with the base 4, that is, to force the inner bevelled end surface 28 of the envelope into engagement with the outer bevelled surface 29 of the base which, in the completed device, constitutes the fused or sealed surfaces 7 previously mentioned above. The tension of the spring and the de-energizing of the solenoid is so controlled as to cause the above function to take place without distorting or, in any way, injuring the parts.

The base 9 is provided with openings 30 communicating with the interior of the bell jar 12 and said openings are connected with a duct 31 which is, in turn, connected with a conventional diffusion pump or any other suitable vacuum creating means, not shown, whereby a high vacuum may be created in the bell jar 12 and internally of the envelope 6 prior to sealing the envelope with the base 4 and simultaneously bring about the degassing of the device. In order to maintain an efficient vacuum and degassing system, a valve 31a is provided in duct 31 adjacent its connection with base 9. Valve 31a, in this case, is operated by a solenoid 31b and a spring 31c which, through its inherent tension, will normally retain the valve plunger 31d seated in the passageway of duct 31 and closing same. Upon energizing solenoid 31b, however, the valve plunger 31d will be drawn against the inherent tension of spring 31c and outwardly of the passageway in duct 31 to permit the degassing of bell jar 12 to take place. By so opening and closing the passageway in duct 31, instant control of the air evacuating and degassing cycle is obtained since the vacuum creating means may be maintained in continuous operation and thus provide an immediately and continually available vacuumized line to the valve 31a.

As mentioned above, the heating element 26 is provided to temperature condition the envelope 6 of the electron discharge device and thus avoid the adverse effects of heat shock during the heat-sealing or fusion at the surfaces 7. In order to accurately determine and to control the temperature to which the envelope 6 is heated by heater 26, a thermocouple 35 is positioned internally of the bell jar 12 with one end thereof in adjacent spaced relation with the envelope 6. The opposed end of said thermocouple 35 is, in turn, electrically connected to a commercially available type of controller 36 such as, for example, a "Brown Pyrovane Controller" manufactured by Minneapolis Honeywell Regulator Company.

The heat-sealing of the edges 7 of envelope 6 and base 4 is accomplished by means of a commercially available high frequency induction heater 32 such as for example, a 2-kilowatt "Lepel High-Frequency Induction Heater" manufactured by Lepel High Frequency Laboratories, Inc. Heater 32 includes a coil 33 in close encircling relation with the exterior of the bell jar 12 adjacent its lower end and so vertically positioned as to surround the area of the electron discharge device adjacent its edges 7. A ring 34, preferably of carbon or the like, is supported on holder 10 and is positioned so as to closely encircle the adjacent beveled surfaces 28 and 29 of the envelope 6 and base 4. By causing a high frequency current to pass through said coil 33, the ring 34 will be heated by the current induced therein from said high frequency coil 33 and in turn cause the glass adjacent the edges 28 and 29 to become heated and fused by the heat radiation from said ring 34. For example, a high frequency current of approximately 450,000 cycles per second for a period of approximately one and one-half minutes would be sufficient to heat a glass of the previously described character to a temperature of approximately 1500° F. which with glasses of the above-mentioned character is sufficient to cause fusion of the edges 28 and 29 with no distortion of the heat-joined parts.

The surfaces 28 and 29 are annular in shape and are carefully controlled so as to have a circumferential fit when in engaged relation with each other prior to fusing. They may be provided with finely ground surfaces, optically polished surfaces or one surface may be polished and the other finely ground as desired but it is important that they do assume an intimate circumferential fit with each other when moved into engaged relation. This intimate fit may be throughout the width of said surfaces or only a portion thereof.

The operation of the device and method of bringing about the desired results is substantially as follows:

The bell jar 12 is first moved to raised position relative to the base 9 by any known suitable means.

The glass base 4 is properly positioned in the holder 10 by extending the conductors 5 inwardly of the longitudinal openings 11 and seating the base 4 in engagement with the adjacent upper surface of said holder 10. The envelope 6 is positioned through the opening 24 in the support 23 and in proper clamping relation with the gripping fingers 14 with its end surface 8 in engagement with the end 22 of the plunger. The bell jaw 12 is then moved downwardly into engagement with the annular seat 13 inwardly of the annular aligning support 13a to locate the surfaces 28 and 29, which in this instance are bevelled, in proper aligned relation with each other.

Figure 4:
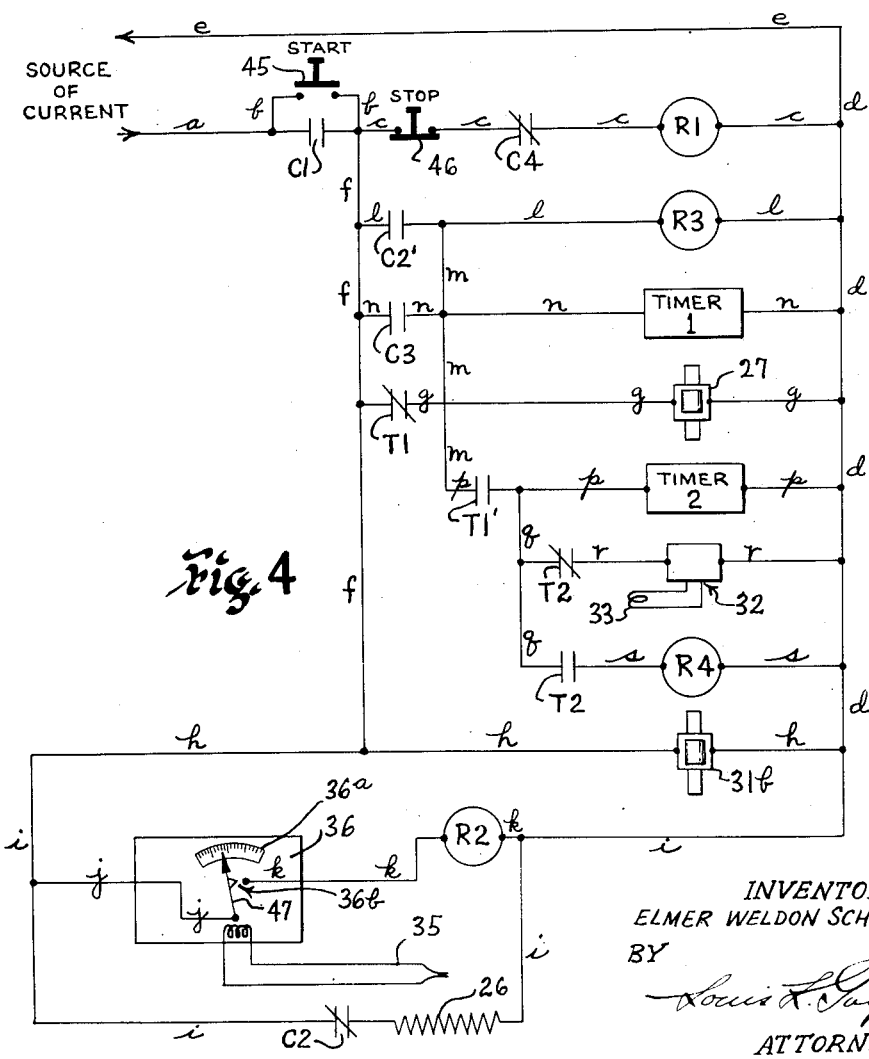
Fig. 4 is a schematic illustration of the electrical circuit for automatically controlling the operation of the device embodying the invention.

Referring more particularly to the schematic diagram of Fig. 4 wherein the symbols R1 through R4 designate conventional control relays, constituting part of the control mechanism, which function to open or close contacts C1 through C4 respectively. Contacts C1 through C4 in this case are illustrated by a pair of short parallel lines.

A diagonal line through said contacts indicates normally closed contacts whereas the absence of said diagonal line indicates normally open contacts. Timers 1 and 2 which constitute another part of said control mechanism also function to open or close their respective contacts T1 and T2 in a manner similar to relays R1 through R4. Timers 1 and 2 may be of a type similar to the commercially available General Electric Process Timer, Type TSA–18 manufactured by General Electric Company. The remaining elements of the schematic diagram of Fig. 4 represent the parts of the apparatus of Fig. 1 and are designated by like reference numerals. The operation of the device now proceeds as follows:

With the bell jar 12 in place as described above, the start push button 45 is activated. This causes R1 to be energized through a circuit passing through lines $a$ and $b$, button 45, line $c$ including the now closed stop push button 46 and normally closed C4 and R1, line $d$ and line $e$. Upon energizing R1, its associated contact C1 is caused to close and provide a hold circuit which parallels the start button 45 and causes R1 to remain energized. By so closing C1, a circuit is completed to the solenoid 27 which causes the envelope 6 to be lifted from base 4 so as to space the surfaces 28 and 29 thereof. At the same time, an additional circuit is completed to the solenoid 31$b$ which opens valve 31$a$ to start the evacuation of bell jar 12 and envelope 6 through its spaced end surfaces 28 and 29. A circuit through heater 26 is also simultaneously completed by the closing of C1 and the pre-heating of envelope 6 by heater 26 is started.

The circuit to solenoid 27 now passes through line $a$, now closed C1, line $f$, line $g$ which includes normally closed T1 and solenoid 27, line $d$ and line $e$.

The circuit to solenoid 31$b$ now passes through line $a$, now closed C1, line $f$, line $h$ which includes solenoid 31$b$, line $d$ and line $e$.

The circuit to heater 26 now passes through line $a$, now closed C1, line $f$, line $h$, line $i$ which includes normally closed C2 and heater 26, line $i$, line $d$ and line $e$.

With heater 26 now in operation, the increasing temperature of the envelope 6 which is being sensed by the thermocouple 35, causes the current thereby induced in said thermocouple to operate the controller 36. Upon reaching a desired glass conditioning temperature in envelope 6 which temperature is recorded by the scale and indicator 36$a$ of the controller 36, a circuit is completed through said controller in a conventional manner by the closing of switch 36$b$ of said controller to energize R2. The circuit to R2 now passes through line $a$, now closed C1, line $f$, line $h$, line $i$, line $j$, switch 36$b$ of controller 36, line $k$ including R2, line $i$, line $d$, and line $e$.

By so energizing R2, its associated normally closed contact C2 in line $i$ is caused to open and disconnect the power to heater 26 while at the same time its second associated normally open contact C2' in line $l$ is caused to close and energize timer 1 by a circuit passing through line $a$, now closed C1, line $f$, line $l$ including now closed C2, line $m$, line $n$ including timer 1, line $d$ and line $e$. At the same time, the closing of C2' in line $l$ simultaneously energizes R3 through a circuit passing through line $a$, now closed C1, line $f$, line $l$ including now closed C2' and R3, line $d$ and line $e$. R3, in turn, then causes its associated contact C3 to close and provide a hold circuit through line $n$ to maintain timer 1 in operation for a given time cycle.

Contacts T1 which are mechanically connected to and are operated by timer 1 are adapted to be energized at the end of the time cycle of said timer 1. During this given time cycle, the controller 36 continues to maintain a predetermined equilibrium temperature about envelope 6 by alternately opening and closing switch 36$b$, thereby energizing and de-energizing the resistance heater 26 through the normally closed contacts C2 in line $i$. The time cycle of timer 1 is such as to permit proper degassing of the envelope 6 by the vacuum creating means.

At the conclusion of the above given time cycle of timer 1, normally closed contact T1 in line $g$ is opened to break the circuit to solenoid 27 whereby the envelope 6 is caused to be lowered by the action of spring 21 and force the beveled edges 28 and 29 into intimate engaging relation with each other. Simultaneous to the above opening of contact T1 in line $g$, normally open contact T1' in line $p$ is closed to initiate the energizing of and operation of timer 2 and the simultaneous energizing of the induction heater 32.

Timer 2 is now operated by a circuit through line $a$, now closed C1, line $f$, line $n$ including now closed C3, line $m$, line $p$ including now closed T1' and timer 2, line $d$ and line $e$.

The induction heater 32 is energized by a circuit through line $a$, now closed C1, line $f$, line $n$ including now closed C3, line $m$, line $p$ including now closed T1', line $q$, line $r$ including normally closed T2 and heater 32, line $d$ and line $e$.

Induction heater 32 continues to operate for a controlled time period as set by timer 2 which period is sufficient to heat and cause fusion of the edges 28 and 29 of envelope 6 and base 4 with no distortion thereof.

At the end of the controlled time period of timer 2, normally closed contact T2' in line $r$ is caused to open and break the circuit to heater 32. Simultaneously, however, the normally open contact T2 in line $s$ is closed to energize R4 by means of a circuit passing through line $a$, now closed C1, line $f$, line $n$ including now closed C3, line $m$, line $p$ including now closed T1, line $q$, line $s$ including now closed T2 and R4, line $d$ and line $e$.

By so energizing R4, the normally closed contact C4 in line $c$ is opened to de-energize R1 which, in turn, again opens C1. C1, being opened, then disconnects all power from all circuits and closes valve 31$a$ to discontinue the evacuation of bell jar 12 and permit said bell jar to be removed from base 9. The completely fused and degassed electron discharge device may then be removed from bell jar 12 and the operation again repeated in the above manner.

A stop switch 46 is positioned in line $c$ for emergency purposes. Actuation of said switch would de-energize R1 and, consequently, open C1 to disconnect all power from all circuits at any time during the above-described operations.

In the present instance, with glass of the type defined above, the heating introduced by the high frequency induction heating unit 32 will be at a temperature of approximately 1500° F. for a time cycle of approximately a minute and a half but it is pointed out, however, that, in any event, it must be carefully controlled according to the characteristics of the glass so as to avoid distorting the envelope 6 and injury to the base 4.

Due to the fact that the vacuum suction is continually maintained in operation throughout the above steps of the process, the envelope 6 will be degassed during the heating thereof by unit 26 and a high vacuum will be formed and maintained internally of the device when the envelope 6 is in fused and sealed relation with the base 4.

Due to the fact that the glasses are of substantially the same coefficient of expansion, a permanent seal will result.

It is to be understood that the temperatures set forth above are for a low melting glass lying between commercially known "crown" and "flint" glasses, that is, it is a glass having a softening point lower than "crown" but greater than "flint" and that if glasses having different softening points and coefficients of expansion are employed, the temperatures and time cycles of heating will be varied accordingly. In each case, the so-called heat shock conditioning temperature, as introduced by the electrical unit 26 and controlled by the thermocouple 35 and controller 36 is such as to avoid distortion of the envelope 6 and yet permit proper degassing of said envelope. The temperature for the induction heating unit 32 and time cycle of said heating as brought about by the carbon ring 34 is so carefully controlled in all instances as to be sufficient to bring about a proper fusing of the beveled surfaces 28 and 29 without distortion of the parts.

While, for ease of disclosure, applicant has shown and described the degassing and heat-joining of the parts of an electron discharge tube, it is to be understood that, with the possible omission of the step of creating a vacuum and with slight changes in the characteristics of the supports for the parts, temperatures and time cycles, the apparatus and method set forth herein may be used in the heat-treating and heat-joining of the parts of several other different forms of devices, particularly devices having glass parts with preshaped surface portions such, for example, as fused bifocal or multifocal lenses. The invention, therefore, is not to be construed in a limiting sense.

Although the engaging surfaces 28 and 29 have been previously referred to as being beveled, it is to be understood that they may be flat, curved or formed to any suitable shape wherein a desired engagement of said surfaces is possible.

From the foregoing description, it will be seen that simple, efficient and economical means and method have been provided for accomplishing all the objects and advantages of the invention.

Having described my invention, I claim:

1. Apparatus for heat-joining a glass part to another glass part, at least one of said glass parts having a preshaped surface to be engaged by and joined with said other part, said apparatus comprising a holder for supporting a first one of said parts, means for gripping and holding the other of said parts with the surface portions thereof which are to be joined in aligned relation with each other, means for raising said gripping means and the part held thereby to a position wherein said surface portions are in spaced adjacent relation with each other, means carried by said support for preheating the parts to a temperature sufficient to relieve heat shock and for a controlled time cycle substantially at said temperature, means for releasing said means for raising said gripping means and the part held thereby at the termination of said time cycle of preheating, means carried by said support for urging said gripping means and the part carried thereby in a downward direction to position the surface portions in engagement with each other and means for heating said surface portions to a temperature and for a controlled time cycle sufficient to cause said surface portions to join with each other and with substantially no distortion of at least one of said parts.

2. Apparatus for heat-joining a glass base having a plurality of conductors supported in sealed relation therewith to a glass envelope, said glass base and said glass envelope each having a surface shaped to intimately engage with each other, said apparatus comprising a holder for receiving said conductors and for supporting the base in a given position, a support having movable means for gripping and holding the envelope with its shaped surface in aligned relation with the shaped surface of the base, means for raising said gripping means and the envelope held thereby to a position wherein its shaped surface is in spaced adjacent relation with the shaped surface of the base, means carried by said support for preheating the envelope to a temperature sufficient to relieve heat shock and for a controlled time cycle substantially at said temperature, means associated with said support for creating a vacuum in said envelope during said time cycle of preheating and for simultaneously degassing said envelope, means for releasing said means for raising said gripping means and envelope at the termination of said time cycle of preheating, means carried by said support for urging said gripping means and envelope in a downward direction to position the shaped surface of said envelope in intimate engagement with the shaped surface of the base and means for heating said surfaces to a temperature and for a controlled time cycle sufficient to cause said surfaces to join in hermetically sealed relation with each other and without distorting the envelope.

3. Apparatus for heat-joining a glass base having a plurality of conductors supported in sealed relation therewith to a glass envelope, said glass base and said glass envelope each having a surface shaped to intimately engage with each other, said apparatus comprising a holder for receiving said conductors and for supporting the base in a given position, a support having movable means for gripping and holding the envelope with its shaped surface in aligned relation with the shaped surface of the base, means responsive to electrical energy for raising said gripping means and the envelope held thereby to a position wherein its shaped surface is in spaced adjacent relation with the shaped surface of the base, means carried by said support for preheating the envelope to a temperature sufficient to relieve heat shock and for a controlled time cycle substantially at said temperature, means associated with said support for creating a vacuum in said envelope during said time cycle of preheating and for simultaneously degassing said envelope, means for de-energizing said means responsive to said electrical energy at the termination of said time cycle of preheating, means carried by said support for urging said gripping means and the envelope carried thereby in a downward direction to position the shaped surface of said envelope in intimate engagement with the shaped surface of the base and means surrounding said engaging surfaces for heating said surfaces to a temperature and for a controlled time cycle sufficient to cause said surfaces to join in hermetically sealed relation with each other and without distorting the envelope.

4. Apparatus for heat-joining a glass base having a plurality of conductors supported in sealed relation therewith and a glass envelope, said glass base and said glass envelope each having a bevelled surface oppositely shaped to intimately engage with each other, said apparatus comprising a bell jar, a holder in said bell jar for receiving said conductors and for supporting the base in a given position, a support in said bell jar having movable means for gripping and holding the envelope with its bevelled surface in aligned relation with the bevelled surface of the base, a solenoid responsive to electrical energy for raising said gripping means and the envelope held thereby to a position wherein its bevelled surface is in spaced adjacent relation with the bevelled surface of the base, means carried by said bell jar for preheating the envelope to a temperature sufficient to relieve heat shock and for a controlled time cycle substantially at said temperature, means associated with said bell jar for creating a vacuum in said envelope during said time cycle of preheating and for simultaneously degassing said envelope, means for de-energizing said solenoid at the termination of said time cycle of preheating, means internally of said bell jar for urging said gripping means and the envelope carried thereby in a downward direction to position the bevelled surface of said envelope in intimate engagement with the bevelled surface of the base and means surrounding said engaging bevelled surfaces for heating said surfaces to a temperature and for a controlled time cycle sufficient to cause said surfaces to join in hermetically sealed relation with each other and without distorting the envelope.

5. Apparatus for heat-joining a glass part having a surface portion of a controlled shape to a given surface portion of another glass part, said apparatus comprising supporting means in which said parts may be placed and held in aligned relation with each other and further comprising automatically functioning means for causing said supporting means to position said surface portions in spaced aligned adjacent relation with each other, automatically functioning means for preheating at least one of said parts for a given time cycle to a temperature below the melting points of said glass parts while said surface portions are retained in said spaced relation, automatically functioning means for releasing said means for retaining said surface portions in spaced relation with each other and to simultaneously cause said portions to move into engagement with each other at the completion of said time cycle and automatically functioning means for heating said engaged surface portions to a temperature and for a time cycle sufficient to heat-join said surface portions with substantially no distortion of said parts.

6. The method of heat-joining glass parts together wherein at least one of said glass parts has a pre-shaped surface portion to be engaged by and joined with a surface portion of said other part, said method comprising supporting said parts with said surface portions in initially spaced relation with each other, preheating said parts to a temperature and for a time cycle sufficient to relieve heat shock while retaining said temperature below that which might soften and distort said parts, moving the surface portions of said preheated parts into engaged relation with each other subsequent to said preheating and heating said engaging surface portions to a higher temperature and for a controlled time cycle sufficient to cause said surface portions to join with each other and with substantially no distortion of at least one of said parts.

7. The method of degassing and hermetically heat-joining a glass base having a plurality of conductors secured in sealed relation therewith to a glass envelope, said method comprising forming preshaped engaging surface portions on said base and envelope, supporting said base and envelope with their preshaped surfaces in initially spaced relation with each other internally of a bell jar, preheating the envelope and base internally of said bell jar to a temperature sufficient to relieve heat shock and for a controlled time cycle substantially at said temperature, creating a vacuum and degassing said envelope during said time cycle of preheating, moving said preshaped surfaces of said base and said envelope into engagement with each other at the termination of said time cycle of preheating and heating said engaged surfaces to a temperature and for a controlled time cycle sufficient to cause said surfaces to join in hermetically sealed relation with each other without distorting the envelope.

8. The method of degassing and hermetically heat-joining a surface portion of a glass base in sealed relation with a surface portion of a glass envelope, said method comprising the placing of said base and envelope in supporting means internally of a bell jar with one of said supporting means being movable toward and away from the other, associating a first means with said movable supporting means for constantly urging it toward the other of said supporting means and associating a second means with said movable supporting means for urging it against said first means in a direction away from said other supporting means by an amount sufficient to initially support said surface portions in adjacent spaced relation with each other, associating automatically functioning heating means with the envelope and base internally of said bell jar for preheating them to a temperature sufficient to relieve heat shock and for substantially retaining said temperature for a controlled time cycle, automatically creating a vacuum and degassing said envelope during said time cycle of preheating, causing said second means associated with said movable supporting means to be released to permit said first means associated therewith to move said surface portions into engagement with each other at the termination of said time cycle of preheating and automatically heating said engaged surfaces to generate heat of a temperature and for a controlled time cycle sufficient to cause said surfaces to join in hermetically sealed relation with each other with substantially no distortion of said base and envelope.

9. The method of heat-joining a surface portion of a glass part with a surface portion of another part, said method comprising the placing of said parts in supporting means with said surface portions in aligned relation, one of said supporting means being movable toward and away from the other, associating a first means with said movable supporting means for constantly urging it toward the other of said supporting means and associating a second means with said movable supporting means for urging it against said first means in a direction away from said other supporting means by an amount sufficient to initially support said surface portions in adjacent spaced relation with each other, associating automatically functioning heating means with the parts internally of said bell jar for preheating them to a temperature sufficient to relieve heat shock and for substantially retaining said temperature for a controlled time cycle, causing said second means associated with said movable supporting means to be released to permit said first means associated therewith to move said surface portions into engagement with each other at the termination of said time cycle of preheating and automatically heating said engaged surfaces to generate heat of a temperature and for a controlled time cycle sufficient to cause said surfaces to join in fused relation with each other and with substantially no distortion of at least one of said parts.

10. The method of heat-joining a surface portion of a glass part with a surface portion of another glass part, said method comprising the placing of said parts in supporting means with said surface portions in aligned relation, one of said supporting means being movable toward and away from the other, associating a first means with said movable supporting means whereby said means may be moved toward the other of said supporting means and associating a second means with said movable supporting means for urging it in a direction away from said other supporting means by an amount sufficient to initially support said surface portions in adjacent spaced relation with each other, associating automatically functioning heating means with the parts for preheating them to a temperature sufficient to relieve heat shock and for a controlled time cycle, causing said second means associated with said movable supporting means to be released to permit said first means associated therewith to move said surface portions into engagement with each other at the termination of said time cycle of preheating and automatically heating said engaged surfaces to generate heat of a temperature and for a controlled time cycle sufficient to cause said surfaces to join in fused relation with each other and with substantially no distortion of at least one of said parts.

References Cited in the file of this patent

UNITED STATES PATENTS

| 2,259,165 | Karasick | Oct. 14, 1941 |
| 2,645,059 | Rowe | July 14, 1953 |

FOREIGN PATENTS

| 989,714 | France | Sept. 12, 1951 |